United States Patent [19]

Cianci et al.

[11] Patent Number: 4,641,984
[45] Date of Patent: Feb. 10, 1987

[54] TUBE COUPLER, PARTICULARLY SUITABLE FOR PLATFORM FOUNDATION PILES

[75] Inventors: Giuseppe Cianci, Milan; Carlo Traverso, Rodano, both of Italy

[73] Assignee: 501 Saipem S.p.A., Milan, Italy

[21] Appl. No.: 782,069

[22] Filed: Sep. 30, 1985

[30] Foreign Application Priority Data

Oct. 11, 1984 [IT] Italy .................................. 23113 A/84

[51] Int. Cl.$^4$ ............................ B25G 3/00; F16B 7/00
[52] U.S. Cl. ...................................... 403/14; 403/297; 405/251; 285/170
[58] Field of Search .................. 403/297, 14; 405/251; 285/170

[56] References Cited

U.S. PATENT DOCUMENTS 2,192,484  3/1940  Bryan .............................. 403/297 X
2,313,625  3/1943  Cobi ................................. 405/247
4,351,624  9/1982  Barber ............................. 405/251 X

FOREIGN PATENT DOCUMENTS 502317  11/1954  Italy .................................. 403/297

Primary Examiner—Andrew V. Kundrat
Attorney, Agent, or Firm—Hedman, Gibson, Costigan & Hoare

[57] ABSTRACT

A tube coupler consisting of a tube piece cut longitudinally and provided internally with two pairs of double-acting hydraulic cylinder-piston units hinged to the wall of the tube piece and each acting on two connecting rods which are hinged to said wall on opposite sides of the longitudinal cut. The tube piece is also provided with two sets of longitudinal spacer members on its outer surface and with frusto-conical endpieces at its extremities.

1 Claim, 2 Drawing Figures

TUBE COUPLER, PARTICULARLY SUITABLE FOR PLATFORM FOUNDATION PILES

This invention relates to a tube coupler which enables the tubes to be brought comfortably and rapidly into a position of mating abutment to then undergo simple welding, thus enabling platform foundation piles to be efficiently and economically installed.

Drilling platform foundations are known to consist of piles driven into the sea bed to a depth which ensures the stability of the supported equipment.

Because of the pile length which has to be installed, it is necessary to use tube portions which are butt-welded one on the other until the required length is attained.

In practice, a first tube portion is driven into the ground with the usual pile drivers, then a second portion is welded to the projecting end of the first portion and is then driven through its entire length, after which a third portion is added to this and so on. As these driving operations deform the upper tube edges, the deformed part is cut away before welding and the tube is bevelled in order to prepare it for welding.

With such a procedure, it is apparent that the most serious problem is bringing the two tubes into a mating and in particular aligned position before the welding.

In the current state of the art, this problem is solved in one of the two following ways:

welding to the inside of the end of the prolongation tube a conical tube piece shaped as a flute mouthpiece, and the prolongation pile tube fitted with the "flute mouthpiece" is inserted into the facing end of the other tube. In this manner, the two facing ends of the two tubes are obliged to align with each other as they are brought together, so enabling them to be butt-welded. In order to give the assembly a certain stability, two sets of eyelets or rings are fixed around the outer surfaces of said two tubes respectively, and are connected together by ties;

alternatively, by using an external coupler.

However, such systems give rise to a series of drawbacks such as the need for a considerable installation time with consequent high costs, no guarantee of perfect alignment, and the impossibility of easy and contiguous welding because of the obstacle created by the presence of the ties or the presence of the external coupler. In addition where the "flute mouthpiece" is used, its inner conical part can easily become welded to the two tube portions.

The object of the present invention is to obviate the aforesaid drawbacks by providing a tube coupler which allows rapid and precise alignment of the tube portions to be welded together, does not obstruct the welding operation and is not influenced in any way by this latter.

This is substantially attained by forming the coupler from a tube piece having an outer diameter less than the inner diameter of the tube portions to be welded together, and removing from this tube piece, along a generating line and over its whole length, a longitudinal strip of about 100 mm width which makes the tube piece non-flexible and enables the tube to reduce or increase its diameter, so enabling the coupler to undergo the movements necessary for respectively releasing or coupling the tube parts to be welded together. For this purpose, two pairs of double-acting hydraulic cylinder-piston units are mounted inside said cut tube piece, each cylinder-piston unit being hinged at one end to the interior of the tube piece opposite the longitudinal cut provided in said tube piece, and hinged at its other end to one end of two connecting rods which are coplanar with the cylinder-piston unit and are themselves hinged at their other ends to the opposite sides of said longitudinal cut respectively, and in proximity thereto. By means of this specific arrangement, the force which has to be exerted in order to vary the diameter of the cut tube piece is a minimum, but there is no objection to hinging the cylinder-piston unit and connecting rods in a different manner and position.

The method of operating the coupler according to the invention is now apparent.

The coupling operation is carried out by inserting the first half of the coupler into the prolongation tube which is to be installed by welding, the coupler then being fixed by expanding the two cylinder-piston units of the relative pair. When the coupler has been locked in this manner, its other half is inserted into the tube already driven into the ground, and is locked to this by expanding the other pair of cylinder-piston units. When the weld has been made, the coupler is released by operating both pairs of cylinder-piston units so that they retract.

In order to create an interspace which obviates any danger of welding the coupler to the tubes, two sets of longitudinal sheet metal members are fixed to the outside of the cut tube piece on its upper half and lower half respectively, their purpose being not only to act as spacers in order to enable the coupled parts to be welded without this interfering with the coupler, but also to enable the coupler to be used for a wide range of tube diameters by simply changing the thickness of the longitudinal members.

Finally, in order to facilitate the withdrawal of the coupler from the tubes, the extremities of said cut tube piece are provided with convex or frusto-conical endpieces.

Thus, the tube coupler is characterised according to the invention by consisting of a tube piece of outer diameter less than the inner diameter of the tubes to be coupled, and comprising a longitudinal cut extending over its entire length and having a width of the order of 1 decimeter, the tube piece being provided in its interior with two pairs of double-acting hydraulic cylinder-piston units, each cylinder-piston unit being hinged at one end to the interior of the tube piece opposite said longitudinal cut and hinged at its other end to one end of two connecting rods which are coplanar with the cylinder-piston unit and are themselves hinged at their other ends to the opposite sides of said longitudinal cut respectively, and in proximity thereto, said tube piece being provided, respectively on the upper half and on the lower half of its outer surface, with two sets of sheet metal longitudinal members acting as spacers, and being provided at its extremities with convex or frusto-conical endpieces.

The invention is described in detail hereinafter with reference to the accompanying drawings which illustrate a preferred embodiment thereof by way of non-limiting example in that technical or constructional modifications can be made thereto without leaving the scope of the present invention.

Figure 1:
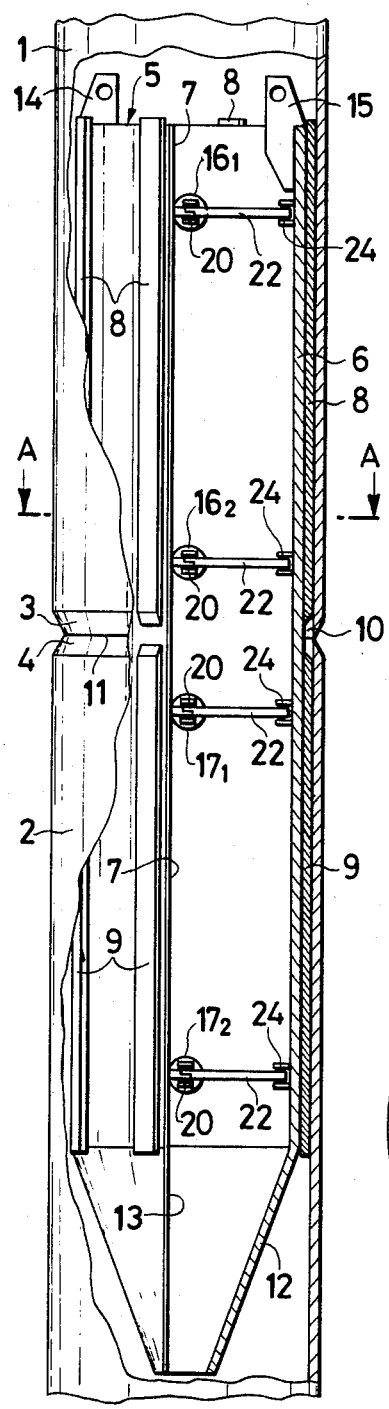
FIG. 1 is a partly cut-away and partly sectional longitudinal view of the coupler according to the invention inserted between two tubes to be joined together by welding.

In the figures, the reference numerals 1 and 2 indicate two tubes provided with a bevel 3 and 4 which are to be butt-welded together, and the reference numeral 5 indicates the coupler according to the invention which keeps them aligned.

Said coupler 5 consists of a tube piece 6 comprising a longitudinal cut 7 and, on its outer surface, two sets of longitudinal members 8 and 9 which create an interspace 10 (see FIG. 1) between the tube piece 6 and the tubes 1 and 2 at welding zone 11.

To the lower extremity of the tube piece 6 there is fixed a frusto-conical endpiece 12 also comprising a longitudinal cut 13 as a continuation of said cut 7, and to the upper extremity of the tube piece 6 there are fixed two plates, 14 and 15 respectively, of right trapezoidal shape provided with holes for hooking the lifting members.

Finally, inside the tube piece 6 there are mounted two pairs of double-acting hydraulic cylinder-piston units, $16_1$, $16_2$ and $17_1$, $17_2$ respectively.

Figure 2:
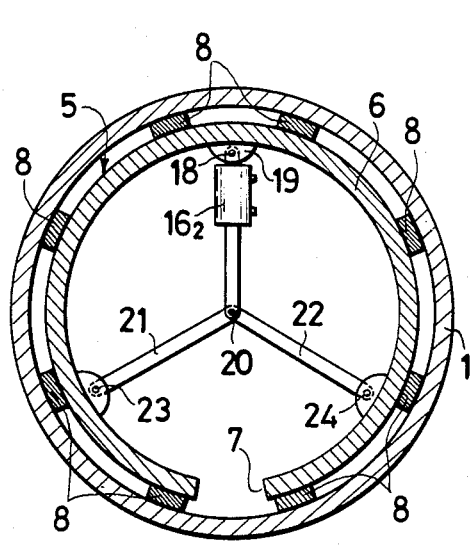
FIG. 2 is a section on the line AA of FIG. 1 to an enlarged scale.

Each cylinder-piston unit is hinged at 18, opposite the cut 7 (see FIG. 2), to rings 19 fixed to the inner wall of the tube piece 6, and is hinged at 20 to two connecting rods 21 and 22 which are themselves hinged, at 23 and 24 respectively, to rings fixed to the inner wall of the tube piece 6 on opposite sides of said longitudinal cut 7.

We claim:

1. A coupler for aligning tube sections to be welded together, comprising:
   (a) a tube piece having upper and lower sections with an outside diameter less than the inside diameter of the tube sections to be welded and a first longitudinal slot coextensive with the length of said tube piece having a width of about 1 decimeter;
   (b) two pair of double-acting hydraulic cylinder piston units, each of said units being hinged at one end to the inner wall of said tube piece at a position opposite said longitudinal slot, the other end of said units being hinged to ends of two coplanar connecting rods, the other ends of said connecting rods being hinged to the inner wall of said tube piece on either side of said longitudinal slot;
   (c) upper and lower sets of spacers positioned about the outer wall of said tube piece so as to provide a space between said tube piece and the tube sections to be welded; and
   (d) a frusto-conical end piece attached to the lower section of said tube piece having a second longitudinal slot coextensive with the length of said end piece.

* * * * *